(12) United States Patent
Carugno

(10) Patent No.: US 12,368,040 B2
(45) Date of Patent: Jul. 22, 2025

(54) METHOD AND APPARATUS FOR THE MOLECULAR ATOMIC ANALYSIS OF A FLUID IN THE GASEOUS STATE

(71) Applicant: ISTITUTO NAZIONALE DI FISICA NUCLEARE, Frascati (IT)

(72) Inventor: Giovanni Carugno, Frascati (IT)

(73) Assignee: ISTITUTO NAZIONALE DI FISICA NUCLEARE, Frascati (IT)

( * ) Notice: Subject to any disclaimer, the term of this patent is extended or adjusted under 35 U.S.C. 154(b) by 479 days.

(21) Appl. No.: 17/916,646

(22) PCT Filed: Apr. 1, 2021

(86) PCT No.: PCT/IB2021/052748
§ 371 (c)(1),
(2) Date: Oct. 3, 2022

(87) PCT Pub. No.: WO2021/198979
PCT Pub. Date: Oct. 7, 2021

(65) Prior Publication Data
US 2023/0154739 A1      May 18, 2023

(30) Foreign Application Priority Data

Apr. 2, 2020 (IT) .................. 102020000007039

(51) Int. Cl.
*H01J 49/16* (2006.01)
*H01J 49/40* (2006.01)

(52) U.S. Cl.
CPC ............ *H01J 49/161* (2013.01); *H01J 49/40* (2013.01)

(58) Field of Classification Search
USPC ................................... 250/282, 281
See application file for complete search history.

(56) References Cited

U.S. PATENT DOCUMENTS 5,751,416 A      5/1998  Singh et al.
6,493,086 B1 *  12/2002  McAndrew ......... C23C 16/4412
                                                  250/341.4
(Continued)

FOREIGN PATENT DOCUMENTS

JP      2008-096104 A      4/2008

OTHER PUBLICATIONS

International Search Report mailed Jun. 29, 2021, in corresponding to International Application No. PCT/IB2021/052748; 3 pages.
(Continued)

*Primary Examiner* — Kiet T Nguyen
(74) *Attorney, Agent, or Firm* — Maier & Maier, PLLC

(57) ABSTRACT

The embodiments relate to a method and an apparatus for the molecular atomic analysis of a fluid in the gaseous state, in particular the method includes introducing a fluid in the gaseous state into a collection chamber having a predetermined internal volume V and generating a laser beam through a laser device. The method may also include focusing the beam onto the fluid sited in the collection chamber, in order to create an electric field in at least a portion V' of the internal volume V, so as to excite the electrons residing on the atoms and molecules present in said fluid in the gaseous state, causing an atomic/molecular alteration of the fluid itself in said portion V'. The method provides detecting the elements emitted after focusing the beam on the fluid, through detection devices and analyzing the elements detected by the detection devices using a processing unit.

13 Claims, 4 Drawing Sheets

(56) References Cited

U.S. PATENT DOCUMENTS

| | | | | |
|---|---|---|---|---|
| 12,135,239 B2* | 11/2024 | Smith | ................ | G02B 5/22 |
| 2007/0068242 A1 | 3/2007 | DiFoggio | | |
| 2014/0125967 A1* | 5/2014 | Otera | ................ | G01J 3/4338 |
| | | | | 356/51 |

OTHER PUBLICATIONS

Written Opinion of the International Searching Authority mailed mailed Jun. 29, 2021, in corresponding to International Application No. PCT/IB2021/052748; 8 pages.

* cited by examiner

METHOD AND APPARATUS FOR THE MOLECULAR ATOMIC ANALYSIS OF A FLUID IN THE GASEOUS STATE

TECHNICAL FIELD

The present invention relates to the sector of molecular atomic analysis, and in particular to the analysis of residual gases present in fluids in the gaseous state. In particular, the invention relates to a method and to an apparatus for the molecular atomic analysis of a fluid in the gaseous state, through an optoelectronic approach.

BACKGROUND

To date, the contamination control of processes in the gaseous phase has been increasingly encouraged and requires increasingly higher performing residual gas analysers (RGAs).

The term "excite" below, which refers to one or more electrons, is intended to indicate the action of disturbing the energy status of the electron, with respect to its rest status.

In general, the RGAs on the market use four-pole technology which analyses and handles the ions, after they have been made electrically active through an ionization process generated by electrons produced by thermionic effect and accelerated to energies of some KeV. The RGA uses an ion source that can be open (technology known as OIS—Open Ion Source) or closed (technology known as CIS—Closed Ion Source).

The limits of current RGAs are dictated by the initial vacuum level necessary to enable operation through the quadrupole measurement device; such parameter regulates the detection sensitivity of the residual gases as well as the scanning time of the radiofrequency for identifying an atomic species. As is known, the generation of energetic electrons is in fact performed by the hot filament technique, which can only be operated at pressures less than $10^{-2}$ Pa, such limit being dictated by the need to keep the filament itself intact.

Therefore, to date, RGAs with OIS technology require a maximum pressure of $10^{-2}$ Pa and enable atomic species to be detected with partial pressures that can reach $10^{-12}$ Pa (in the case for example of $N_2$ with an atomic mass number of 28).

On the other hand, RGAs with CIS technology make it possible to work at a pressure comprised between 1 Pa and $10^{-2}$ Pa, but they require a vacuum pump able to generate a deep vacuum (in the order of $10^{-3}$ Pa) to preserve the filament that produces the thermoionic current which ionises the atomic species present in the chamber subject to control. The partial pressure limit that can be detected settles at around $10^{-7}$ Pa.

From the above it can be deduced that one of the limits of the RGA head is connected with the delicacy of the management of the thermoionic filament, which starts to operate at pressures of less than $10^{-2}$ Pa and which is a delicate element of the head itself.

An alternative analysis methodology of the elements of a solid body constituting a material, operating efficiently on solid materials, makes use of the technology known as LIBS i.e. Laser Induced Breakdown Spectroscopy. According to this technique a high power pulsed laser device is used with which a sample of material is radiated, through a beam having a waist (w) which can vary from about 10 µm to about 100 µm, and a pulse energy in the order of various mJ. The electric field generated by such beam is such as to excite and ionize the atoms present in the volume of sample-material, leading to the formation of a plasma expanding at high temperature (5,000-20,000 K) after which an analysis of the optical spectrum emitted by such plasma is performed using an optical and electric spectrometer.

As mentioned, such technique is—by its intrinsic nature—efficient on the analysis of solid samples as the energy transfer process of the laser beam to the material, adapted to generate the plasma, depends on the density of the means on which the laser beam is concentrated due to the effect of the braking radiation.

Therefore, there is a need perceived for a method and an apparatus for the atomic/molecular analysis of samples in the gaseous state, which enables operation in diversified pressure conditions, i.e. between values that can vary from atmospheric pressure or greater to values in the order of $10^{-7}$ Pa, and to conduct different types of sample analysis, i.e. using optical and/or electrical signals, through a single apparatus.

SUMMARY

An object of the present invention is to overcome the disadvantages of the prior art.

In particular, it is an object of the present invention to present a method for conducting an accurate molecular atomic analysis of a sample of fluid in the gaseous state, in order to detect any residual gases present therein, in variable pressure conditions from values proximal to or greater than atmospheric pressure, to vacuum values in the order of $10^{-7}$ Pa.

Another object of the present invention is to present a method for conducting an atomic and molecular analysis that is simple to implement and use.

A further object of the present invention is to present an apparatus for conducting an atomic and molecular analysis on a sample of fluid, which is of contained dimensions and suitable to be transported, in order to conduct said analysis in situ.

These and other objects of the present invention are achieved by a method and apparatus incorporating the features of the annexed claims, which form an integral part of the present description.

According to a first aspect, the present invention relates to a method for the molecular atomic analysis of a fluid in the gaseous state, comprising introducing a fluid in the gaseous state into a collection chamber having a predetermined internal volume V. The method further provides generating a laser beam by means of a laser device and focusing this beam into the fluid sited in the collection chamber, in order to create an electric field in at least a portion V' of the internal volume V, such as to excite the electrons residing on the atoms and molecules of said fluid in the gaseous state, whose binding energy is between about 1 eV and about 10 eV, causing an atomic/molecular alteration of the fluid itself in said portion V'. The method therefore provides detecting the elements emitted after focusing the beam into said fluid, through detection means and analysing the elements detected by the detection means using a processing unit. In the method according to the invention, said generation of a laser beam comprises varying the frequency of the beam emitted at least once; the processing unit is configured to operate said frequency variation of the laser beam emitted by the laser device on the basis of the pressure conditions of the fluid sited in the collection chamber.

According to such solution, it is advantageously possible to conduct an accurate molecular atomic analysis of a sample of fluid in the gaseous state in variable pressure conditions, from values proximal to or greater than atmospheric pressure, to vacuum values in the order of $10^{-7}$ Pa.

According to a further aspect, the invention relates to an apparatus for the molecular atomic analysis of a fluid in the gaseous state comprising a laser device, a focusing lens and a collection chamber configured to house a gaseous fluid. The apparatus further comprises a detection means comprising optical fiber elements, associated with a diffraction grating, and/or at least two electrodes placed at a potential difference whose value is comprised between 1 KV and 30 KV, preferably comprised between 1 KV and 10 KV. The apparatus further comprises a processing unit, connected to said detection elements, and comprising at least one analysis device for carrying out a spectroscopic analysis of the elements detected by the detection means, and at least one analysis device for carry out a spectrometric analysis of the elements detected through the detection means.

Such solution enables a single apparatus to be made through which the analysis of the fluid sample in the gaseous state is performed highly efficiently on a fluid in different atomic/molecular density and pressure conditions.

The present invention may have at least one of the following preferred features, taken individually or in combination with any other one of the preferred characteristics described.

Preferably, the processing unit is configured to operate said variation of the frequency of the beam emitted in IR frequencies, upon the occurrence of a pressure of the fluid sited in the collection chamber whose value is comprised between about $10^5$ Pa and about 3.3 Pa, and/or in UV frequencies, upon the occurrence of a pressure of the fluid sited in the collection chamber whose value is between about $10^{-1}$ Pa and about $10^{-8}$ Pa.

Preferably, the processing unit is configured to operate said variation of the frequency of the beam emitted by the laser device in VIS frequencies, upon the occurrence of a pressure of the fluid sited in the collection chamber, whose value is comprised between about 3.3 Pa to about $10^{-1}$ Pa.

Preferably, the laser device is a pulsed laser, with pulse energy comprised between 1 mJ and 300 mJ, a pulse comprised between 0.1 ns and 10 ns and in which the emitted beam is focused in an area ranging from 0.01 mm$^2$ to 1 mm$^2$.

In a preferred embodiment, the laser device is a pulsed laser, with pulse energy comprised between about 10 mJ and about 100 mJ; preferably the pulse is comprised between about 1 ns and about 8 ns; preferably the emitted beam is focused in a variable area between about 0.01 mm$^2$ and about 1 mm$^2$.

According to such configuration it is therefore advantageously possible to operate on different optical frequencies, i.e. infra-red (IR), visible (VIS) and ultraviolet (UV). The method and apparatus according to the invention therefore make it possible to advantageously exploit the actual characteristics of the different emission frequencies, to perform a complete and accurate analysis of the fluid in the gaseous state.

Preferably, said focusing a laser beam into the fluid comprises realizing an optical path that crosses in succession a focusing lens placed outside the collection chamber, an inlet section of the collection chamber and an outlet section of the chamber itself, to terminate at a beam absorption device.

Preferably, the detection means comprises optical fiber elements associated with a diffraction grating.

Preferably, the detection means comprise at least two electrodes placed at a potential difference, the value of which is comprised between 1 KV and 30 KV, preferably comprised between 1 KV and 10 KV, said detection means being connected with said processing unit.

Preferably, the processing unit comprises at least one analysis device to carry out a spectroscopic analysis of the elements detected by the detection means and at least one analysis device to carry out a spectrometric analysis of the elements detected by the detection means.

This advantageously enables an analysis to be performed on a sample of fluid in the gaseous state based on the specific requirements, using an optical or electric signal.

Preferably, the analysis device comprises a spectrometer using at least one charge coupled device having a spectral resolution of 0.1 nm to 1 nm and a band coverage comprised between 200 nm and 1700 nm, said charge coupled device being configured to analyse the elements detected by the optical fiber elements.

According to such configuration, the method and apparatus according to the invention advantageously enable the spectrum emitted to be recorded and the atomic and molecular species present in the fluid being examined to be identified on the basis of their atomic composition, both at atmospheric pressure and in a vacuum up to pressure proximal to a value of $10^{-7}$ Pa.

Advantageously, the method described does not present any limitations on the vacuum generation operations, normally necessary for triggering the optical analysis and it can therefore be used to identify atoms/molecules also at atmospheric pressure.

Preferably, the analysis device is configured to analyse the elements, detected by means of the at least two electrodes, by determining a time-of-flight parameter, for each element emitted.

Preferably, the processing unit is configured to select the analysis device on the basis of the data detected by the detection means.

Preferably, the processing unit is configured to vary the frequency of the beam emitted by the laser device, on the basis of the data detected using the detection means.

Such configuration advantageously enables the characteristics of the laser beam emitted by the laser device to be regulated on the basis of different analysis approaches, using a single apparatus.

Preferably, the collection chamber has a cylindrical conformation, having a diameter whose value is comprised between about 30 mm and about 50 mm. Preferably, the collection chamber has a length whose value is comprised between 100 mm and 300 mm.

Such configuration enables an apparatus to be obtained for the analysis of a sample of fluid, which is of contained dimensions and suitable for transport, so as to be able to advantageously conduct said analysis also in situ.

Further features and advantages of the present invention will be more apparent from the description of the accompanying drawings.

BRIEF DESCRIPTION OF THE DRAWINGS

The invention will be described below with reference to some examples, provided for explanatory and non-limiting purposes, and illustrated in the accompanying drawings. These drawings illustrate different aspects and embodiments of the present invention and, where appropriate, reference numerals illustrating similar structures, components, materials and/or elements in different figures are indicated by similar reference numbers.

DETAILED DESCRIPTION OF THE EMBODIMENTS

Figure 1:
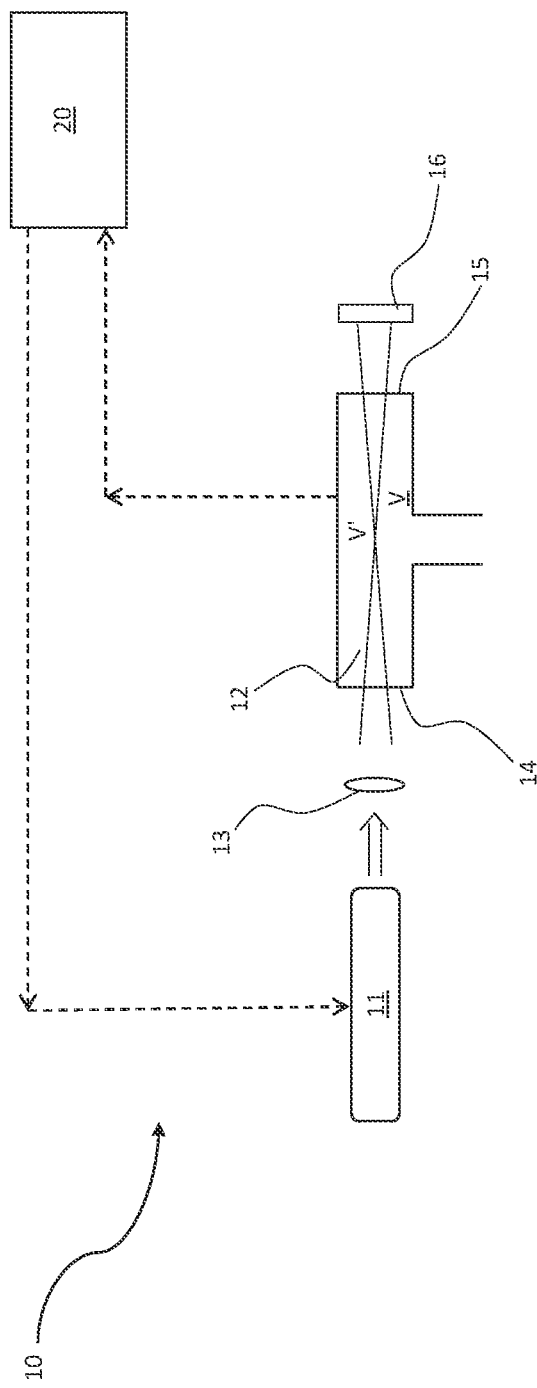
FIG. 1 illustrates a diagram of an apparatus for the molecular atomic analysis of a sample of fluid in the gaseous state, operating the method of the present invention.

While the invention is susceptible to various modifications and alternative constructions, certain preferred embodiments are shown in the drawings and are described hereinbelow in detail. It is in any case to be noted that there is no intention to limit the invention to the specific embodiment illustrated, rather on the contrary, the invention intends covering all the modifications, alternative and equivalent constructions that fall within the scope of the invention as defined in the claims.

The use of "for example", "etc.", "or" indicates non-exclusive alternatives without limitation, unless otherwise indicated. The use of "includes" means "includes, but not limited to" unless otherwise stated.

Figure 2:
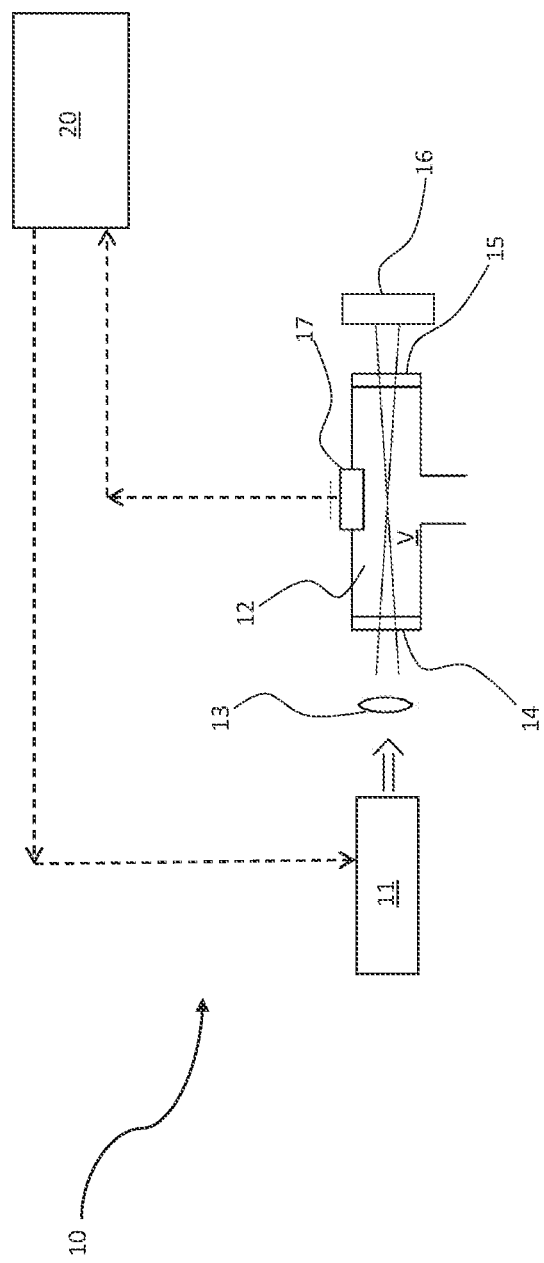
FIG. 2 schematically illustrates a detail of the apparatus of FIG. 1, with some parts removed to better highlight others.
Figure 3:
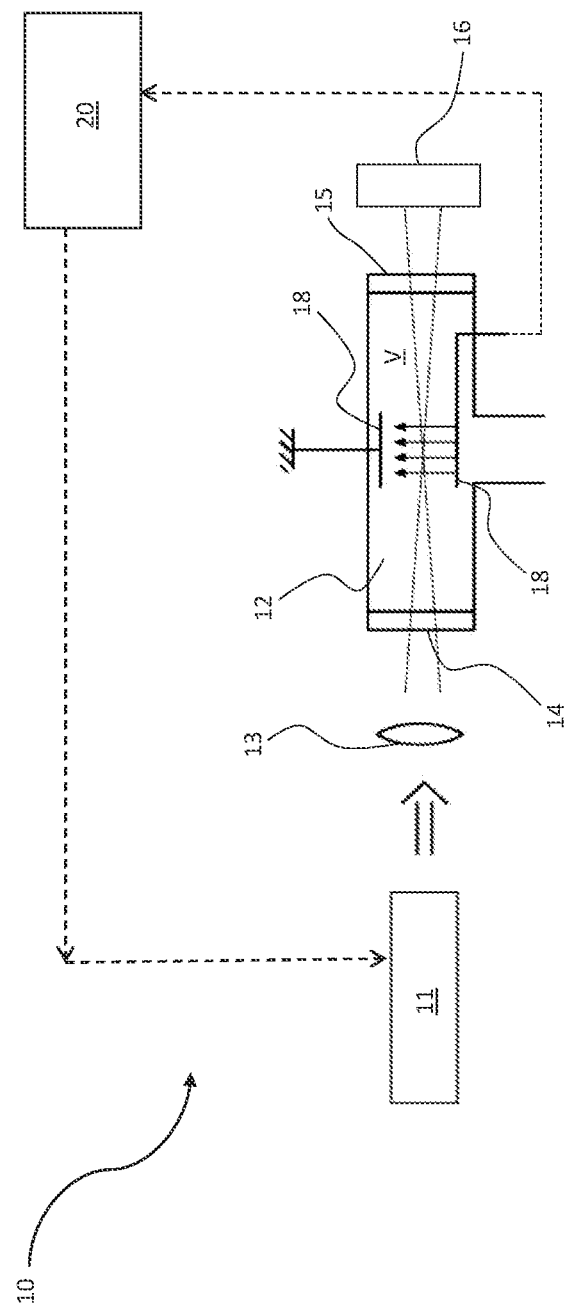
FIG. 3 schematically illustrates a further detail of the apparatus of FIG. 1, with some parts removed to better highlight others.
Figure 4:
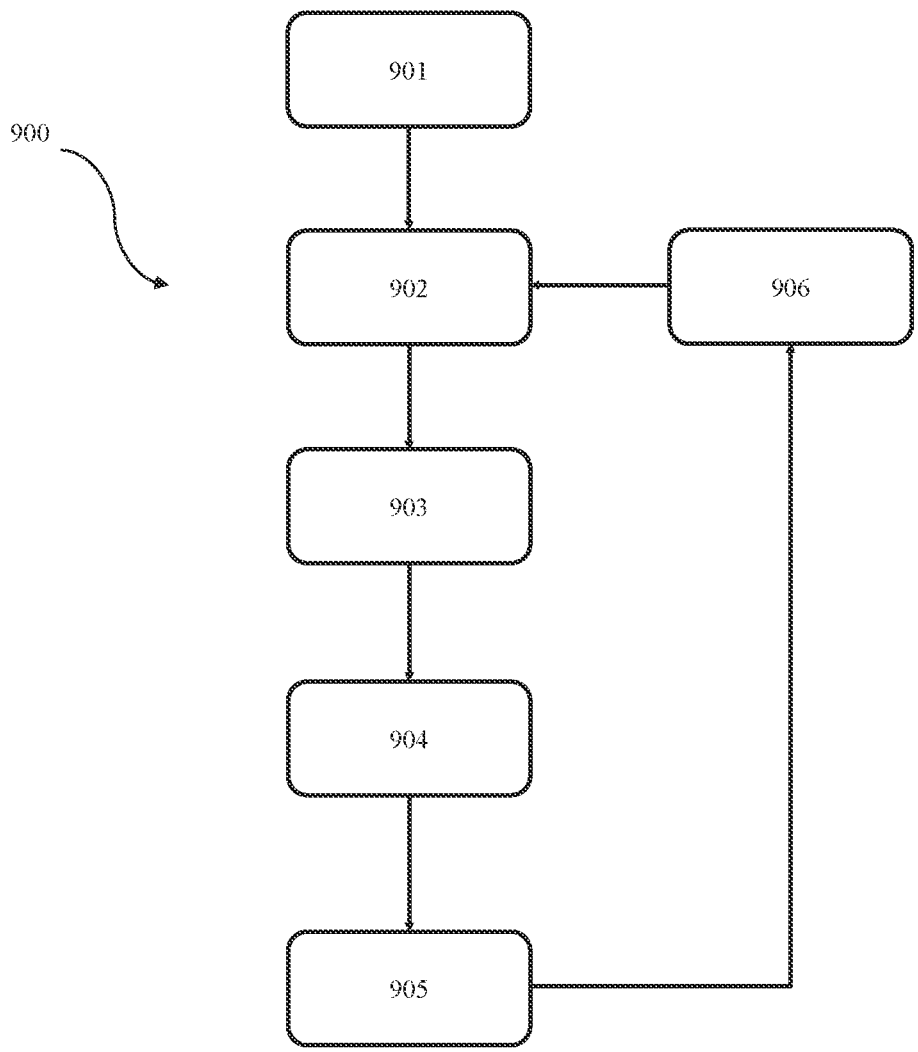
FIG. 4 is a flow diagram of a method for the molecular atomic analysis of a fluid in the gaseous state, according to an embodiment of the present invention.

With reference to FIGS. 1-3, 10 has been used to indicate overall an apparatus for the molecular atomic analysis of a sample of fluid in the gaseous state, according to the present invention.

The apparatus 10 comprises a laser device 11, a focusing lens 13 and a collection chamber 12 comprising an inlet section 14 and an outlet section 15. The collection chamber has an internal volume V and is configured to house a gaseous fluid to be subjected to atomic/molecular analysis.

The apparatus 10 further comprises detection means 17, 18 and an absorption device 16 for absorbing the beam emitted by the laser device 11.

According to the present invention, the laser device 11 is preferably a laser pulsed at high power, i.e. in the order of a few tens of MW, configured to create in at least one portion V' of the internal volume V an electric field such as to excite the electrons that reside on the atoms and molecules of said fluid in the gaseous state, whose binding energy is generally comprised between 1 eV and 10 eV, causing an atomic/molecular alteration of the fluid itself in said portion V'. The pulsed laser is also advantageously configured to send a pulse of photoelectrons produced inside the sample to be analysed to a portion V'.

According to a preferred embodiment of the apparatus 10 according to the present invention, a laser device 11 of the Q-switch type is advantageously used, operating at different frequencies (e.g. such as to enable an emission of beams with a wavelength equal to 1064 nm, 532 nm and 266 nm), and configured to emit a pulse in the order of nanoseconds with a pulse repetition frequency from about 10 Hz to about 10 KHz. Thanks to this type of laser, it is therefore advantageously possible to operate on three different optical frequencies: infra-red (IR), visible (VIS) and ultraviolet (UV).

Preferably, the laser beam is generated by the laser device 11 with pulse energy of about 100 mJ, a pulse of a few ns (nanoseconds) and the beam is focused in an area of a fraction of a $mm^2$ within the volume V. The beam emitted can further be focused outside the volume V to create a pulse of photoelectrons subsequently transported into the volume V.

The apparatus 10 further comprises a processing unit 20, connected to the detection means 17, 18, and configured to process the data detected by such detection means 17, 18; preferably the processing unit 20 is connected to the laser device 11 and is configured for the control thereof.

Preferably, the detection means comprise optical fiber elements 17, associated with a diffraction grating, and at least two electrodes 18 placed at a potential difference whose value is comprised between 1 KV and 30 KV, one of said two electrodes being configured so as to send the signal to an amplifier which has a high gain-bandwidth product; according to the invention, the optical fiber elements 17 and the electrodes 18 are connected to said processing unit 20. According to a preferred configuration of the invention, the two electrodes 18 are placed at a potential difference the value of which is comprised between 1 KV and 10 KV.

According to a preferred embodiment, the processing unit 20 comprises at least one analysis device for performing a spectroscopic analysis of the elements detected by the detection means 17, i.e. the emission frequency bands of the atoms that have been previously brought into excited states (according to the methods described above) are analysed which, during the course of the de-excitation process that follows a temporary stop of the emission of the laser beam, emit photons in the visible or infra-red region and can be identified based on the emission lines that are characteristic of the species that emits them. Such spectroscopic analysis device preferably consisting of a spectrometer using at least one charge coupled device having a spectral resolution from 0.1 nm to 1 nm and a band coverage comprised between 200 nm and 1700 nm in the case of optical analysis.

According to a preferred embodiment, the processing unit 20 comprises at least one analysis device for performing a spectrometric analysis of the elements detected by means of the detection means 18, i.e. temporal analysis of the charge pulses collected on one of the electrodes is used, thanks to the fact that every atomic or molecular species, when subjected to a defined electric field, has times-of-flight dependent on its own mass; in this way, it is possible to distinguish between the various elements present in the volume V' as the generation time is provided for all by the laser pulse, the pulse duration of which is in the order of a nanosecond.

Preferably, the spectrometric analysis device is configured to analyse the elements detected by the electrodes 18, through the determination of a time-of-flight (TOF) parameter for every element emitted.

Preferably, whatever the embodiment of the apparatus 10 according to the present invention, the collection chamber 12 has an elongated conformation. Preferably, the collection chamber 12 has a substantially cylindrical conformation, having a diameter value comprised between about 30 mm and about 50 mm. Even more preferably, the collection chamber 12 has a length comprised between 10 cm and 30 cm.

It is however clear that other possible embodiments of the collection chamber 12 are possible, in particular the dimensions thereof can vary as a function of the specific use requirements.

Having described the structure of the apparatus 10 a method is now described for the atomic/molecular analysis of a fluid in the gaseous state, according to an embodiment of the present invention.

The method 900 according to the present invention provides introducing (block 901) a gaseous fluid into the internal volume V of the collection chamber 12 so as to construct a sample of fluid having a circumscribed volume.

Subsequently, the method provides generating (block 902) a laser beam, through the laser device 11, on the fluid sample present inside the collection chamber 12, and focusing (block 903) such beam so as to create an optical path that crosses in the following order: the focusing lens 13, the inlet section 14 of the collection chamber 12 and the outlet section 15 of the chamber itself, for terminating at the absorption device 16 of the beam.

The focusing of said laser beam on the sample of gaseous fluid present in the internal volume of the collection chamber 12 produces an atomic/molecular alteration of the fluid itself, causing both the excitation and ionization of the elements present in the interaction volume so as to generate atomic or molecular states in unbalanced conditions, which return to balance through the emission of photons or electrons in the empty band. The relaxing processes using photons or electrons can be exploited i.e. such de-excitation channels can be advantageously detected (block 904) by the detection means 17, 18 placed inside the collection chamber 12 and/or in proximity to the chamber itself.

During the design of the specific parameters of the laser device 11, through the Poynting vector, it is possible to calculate the value of the electric field in the volume radiated by the laser beam; such field must be compared with the field of the electrons present in the orbits of atoms/molecules in balanced conditions. If the fields are comparable, then the electric field generated by the laser beam can excite and ionize the atoms or molecules present in the interaction region. These two states of the material, excitation and ionization, can be advantageously used to get to know which atoms or molecules are present in the investigation volume through two different analyses, a first one performed using an optical approach and a second one through an electronic approach.

According to a preferred embodiment, the laser beam can be configured to generate a pulsed current of energetic electrons that is produced outside of the volume V and subsequently, through electrodes on the measurement chamber, introduced into the chamber in the interaction region V'.

In particular, it is possible to determine the properties of the laser beam generation and focusing step so that, in at least one portion V' of the internal volume V, an electric field is created such as to excite the electrons that reside on the atoms and molecules of said fluid in the gaseous state, whose binding energy is generally comprised between about 1 eV and about 10 eV, causing an atomic/molecular alteration of the fluid itself in said portion V' of the internal volume V.

The method of the present invention therefore advantageously provides the possibility of generating the laser beam and focusing it on the fluid present inside the collection chamber 12, causing the atomic/molecular alteration of the fluid itself as described above. The method according to the present invention further advantageously enables a pulsed electric current to be generated, to be sent into the measurement chamber V.

More in particular, the method according to the invention exploits the characteristics of the different frequencies emitted through the laser device 11, to analyse the sample of fluid, present in the internal volume V of the collection chamber 12, in different possible atomic/molecular density and pressure conditions. The above investigation is based on the assumption that the composition of the fluid in the gaseous state is constant inside the internal volume V of the collection chamber 12.

According to a preferred configuration, three different frequencies of the emitted laser beam are possible, used to examine the sample of fluid in the gaseous state in three different respective conditions, i.e.:

A—turbulent regime or low vacuum conditions, in which the pressure can vary from about $10^5$ Pa to about $10^3$ Pa;

B—viscous regime or medium vacuum conditions, in which the pressure can vary from about $10^3$ Pa to about $10^{-1}$ Pa; and C—molecular regime or high vacuum or ultra high vacuum conditions, in which the pressure can vary from about $10^{-1}$ Pa to $10^{-8}$ Pa.

According to such a configuration, the frequencies of the laser in the IR, VIS and UV spectrum are used respectively for the analysis of a fluid in the gaseous state in the turbulent and viscous regime conditions (A and B) for generating electric fields proximal to the electric fields in which the electrons reside on the orbitals of the atoms or for sending a pulsed current of energetic electrons into the analysis volume of the chamber V. The frequency relative to a UV laser beam is instead used for the analysis of the fluid in the molecular regime conditions (C) and/or for generating a pulse of photoelectrons which, subject to acceleration, are injected into the region of the fluid in the gaseous state to be investigated, so as to ionize and excite the atoms and molecules met in such a region.

Preferably, the emission of the laser beam is advantageously managed by the processing unit 20, which operates the variation of the frequency of the laser beam emitted through the laser device 11, according to the pressure conditions of the fluid in the gaseous state present in the collection chamber 12.

In more detail, in a possible embodiment of the method according to the invention, the processing unit 20 activates in a first step the laser device 11 so that a laser beam is emitted in the IR spectrum and is focused into the sample V' and/or generates a pulse of electric current from the outside towards the inside of the sample V', so as to investigate the pressure regime of the sample of fluid itself. Following the emissions generated by the material present in the sample hit by the aforesaid beam, the processing unit 20 is indeed configured to analyse the signals received by the detection means 17 and 18 related to such emissions, or respectively an optical signal and an ion signal (on one of the electrodes 18) and to activate the laser device 11 again by automatically selecting the frequency of the beam to be emitted in a second step, so that it is coherent with the pressure regime detected.

For example, when an optical signal is detected with a background in the optical region in the continuum and a low ion current measurement, the processing unit 20 determines that the state of the sample of fluid is found in a type A region (turbulent regime or low vacuum conditions) and activates the laser device 11 again so as to emit a beam having an optical frequency coherent with such pressure regime; on the contrary, the processing unit 20 activates the laser device 11 so that a laser beam is emitted in the VIS spectrum and a pulse of electronic current from the outside towards the inside of the sample V' and performs a new analysis of the signals received by the detection means 17 and 18 following the emissions generated by the sample of fluid, i.e. an optical signal and an ion signal, respectively.

When a modest optical signal is received and a higher ion current measurement with respect to the previous measurement, the processing unit 20 determines that the state of the fluid sample is in a type B region (viscous region or medium vacuum conditions) and activates the laser device 11 again so as to emit a beam having an optical frequency coherent with such pressure regime. When, instead, no optical signal is detected but only an ion current measurement, the processing unit 20 detects that the state of the fluid sample is in a C type regime (molecular regime or high vacuum conditions) and also in this case it activates the laser device 11 again so as to emit a beam having an optical frequency coherent with such pressure regime.

In substance, the processing unit 20 is configured to manage the optical frequency variation of the beam emitted by the laser device 11, i.e. IR, VIS or UV, on the basis of the data detected through the detection means 17, 18 (by means of which it is possible to determine the pressure regime of the fluid sample itself) through a feedback process between optical frequency emitted by laser and light-charge collected by the detection means themselves.

The method 900 according to the invention further advantageously comprises varying (block 906) at least once the frequency of the emitted beam. Preferably, the frequency variation of the emitted beam is actuated by means of the processing unit 20 in order to generate a laser beam in IR frequencies upon the occurrence of pressure conditions specific to the turbulent regime of the fluid present in the collection chamber 12, as previously described, i.e. pressure values comprised in the range from about $10^5$ Pa to a few Pa, preferably from about $10^5$ Pa to about 3.3 Pa, and/or in UV frequencies, upon the occurrence of pressure conditions specific to the molecular regime of the fluid present in the collection chamber 12, i.e. pressure values comprised in the range from about $10^{-1}$ Pa to $10^{-8}$ Pa.

According to a preferred embodiment said frequency variation of the emitted beam is actuated by the processing unit 20 so as to generate a laser beam in VIS frequency, upon the occurrence of the pressure conditions specific to the viscous regime, i.e. about 3.3 Pa to about $10^{-1}$ Pa. Such variation can be performed both starting from IR laser frequencies and UV ones. In other words, the invention is not limited to the frequency variation of the laser according to a predefined order.

The method 900 also provides analysing (block 905) the elements detected by the detection means 17, 18 by means of the processing unit 20 which, as mentioned, is advantageously configured to operate an optical and/or electronic analysis, thanks to the different types of analysis devices present therein.

More in particular, the elements detected are associated with respective signals that are sent to the processing unit 20, configured to perform an analysis thereof and to provide indications regarding the structure of the elements in the sample being examined as well as the quantity thereof.

According to a first optical analysis approach performed according to the method 900, the emission spectrum emitted by the fluid sample present inside the collection chamber 12 is analysed, which is excited by a laser beam; such emission spectrum is detected through the detection means 17 which, as mentioned, preferably comprises optical fiber elements, associated with a diffraction grating. The emission spectrum collected, as well as a continuum due to the plasma temperature, also has a series of lines due to the excitation of the atoms/molecules present in the gaseous fluid which are peculiar to the excited species, with the consequent return to their fundamental state which generates a current/charge pulse which, once collected, is used by the processing unit 20 for identifying the pressure range in which the fluid sample being examined is found.

Through the registration of the spectrum and of the current pulse emitted and the sending of the related signals to the processing unit 20, the atomic and molecular species present in the system are identified based on their atomic composition, both at atmospheric pressure and under vacuum up to pressures proximal to a value of $10^{-7}$ Pa.

Advantageously, the method described does not present any limitations on the vacuum generation operations, normally necessary for triggering the optical analysis and it can therefore be used to identify atoms/molecules also in an atmospheric pressure environment. In fact, with the method described above, it is not necessary to access the high vacuum regime in order to trigger the emission of thermoionic electrons, thus making it possible to start collecting the emission spectrum already at high pressure.

According to such optical type analysis, the processing unit 20 preferably comprises a spectrometer using CCDs (Charge-Coupled Devices), having a spectral resolution from 0.1 nm to 1 nm and with a band coverage comprised between 200 nm and 1700 nm and amplifiers with a high gain-bandwidth product connected to the internal electrodes.

According to an electronic type analysis approach performed according to the method 900, the processing unit 20 further comprises at least one analysis device for performing a spectrometric analysis of the elements detected by the detection means 18.

Such method exploits the fact that the laser beam generated by the laser device 11, according to the parametering highlighted above, comprises radiation in the ultraviolet field; in fact, ultraviolet enables an electron pulse to be produced, through the photoelectric effect, which follows the same time pulse as the laser beam incident on the gaseous fluid to be analysed, and which implies further excitation of the atoms/molecules present therein.

More in particular, as mentioned in the description of the apparatus 10, according to a preferred embodiment there are at least two electrodes 18 inside the collection chamber 12. According to such configuration, the method 900 enables the laser beam emitted to be used according to two possible modes: a first one which makes use of the generation of ions through the high laser field generated in the infra-red or visible frequency, the second which makes use of the generation of photoelectrons generated by the UV source, in turn accelerated by two electrodes subjected to voltage, so as to acquire kinetic energy such as to succeed in ionizing the molecules of the means present in the interaction region. Such configuration of generating electrons through the photoelectric effect can be advantageously used both to directly generate electrons inside the chamber in the event in which the fluid sample is in the type B or C pressure regime, or the electrons can be generated outside the chamber and made to enter into the analysis chamber, e.g. by means of a thin diamond window (not shown in the figures). In the zone explored by the high density laser beam or by the accelerated electrons, the electrode system 18 enables the generated ions to be converged onto an analysis device (not shown in the figures) which detects the presence thereof individually or collectively as a function of the quantity of ions produced.

The ions produced in the interaction between the laser beam or the accelerated photoelectrons and the atoms/molecules present in the gaseous fluid sample, following the electric field lines, can be collected on the electrodes themselves or otherwise on a device apt to measure the individual presence of the ions. As a function of the pressure regime being analysed, it is therefore advantageously possible to measure an average current, in the case that the fluid sample is in presence of the type A or B pressure regime; if instead it is in the type C pressure regime, it is possible to detect the individual arrival of each ion on a semi-conductor device, e.g. of the silicon photomultiplier type. These two collection methods make it possible to decide, through the processing unit 20, to operate according to the methodology of the interaction of ions or according to the methodology employing the time-of-flight mass spectrometer.

Thanks to the arrival time differences of the various atomic and molecular species in the interaction zone between fluid and laser or electron beam, and by exploiting the fact that they were all produced at the same moment and in the same spatial zone and under the same electric field, it is possible to reconstruct the spectrum of the species present by means of a time-of-flight analysis (TOF) of the emitted particles, performed by the processing unit 20.

The method according to the present invention advantageously provides the processing unit 20 being configured to select the analysis device on the basis of the data detected through the detection means 17, 18.

According to such configuration, the processing unit 20 is able to compare the energy and frequency of the emitted beam with the data detected by the detection means 17, 18 and consequently decide the emission frequency of the laser beam so as to optimize the investigation of the fluid sample in the gaseous state inside the collection chamber 12. As previously described, the sample analysis procedure performed by the processing unit 20 provides testing the sample with IR light and electronic current pulse sent from the outside and analysing the type of emissions through the detection means 17, 18 so as to maintain the same optical frequency for refining the sample analysis process or modifying it. Through the reiteration of the emission steps (laser beam—electrons) and elements collected (emitted light—ionic charge) it is thus possible to accurately outline the pressure state of the fluid inside the volume V and it is possible to proceed more accurately in the analysis of the species present in the chamber. During the analysis, the conditions of the aforesaid fluid sample will mutate until, upon the occurrence of high vacuum conditions, the processing unit 20 generates a UV laser beam, which produces by photoelectric effect a bunch of electrons that will roughly follow the time profile of the laser beam (e.g. about 10 nanoseconds). Such electrons can thus be extracted, e.g. by a metal photocathode placed at negative voltage (not illustrated in the figures), adapted to accelerate the electrons to a few KeV of energy. The electrons thus energized can in this way constitute the investigation means for the fluid which is in ultra high vacuum conditions, so as to perform an accurate analysis thereof, maintaining the integrity of the apparatus 10 operating the method according to the invention also thanks to the use of devices, such as silicon photomultiplier ones, which have great detection sensitivity also of individual electrons and photons.

The method 900 according to the invention therefore advantageously enables the characteristics of the laser beam emitted by the laser device 11 to be regulated according to different analysis approaches, using a single apparatus 10.

The method 900, by enabling analysis to be performed on a fluid sample in the gaseous state, based on specific requirements, an optical or electric signal, implies many possible applications.

It is for example possible to use the method and apparatus according to the present invention for performing pressure measurements, or gas composition measurements, and spectral line searches or mass spectrometry signals for detecting for example contaminants present in the gaseous fluid sample (e.g. $CO_2$, methane, styrene, harmful gas fractions).

Thanks to the possibility to operate at atmospheric pressure it is also possible to use the apparatus according to the invention to detect uncontrolled losses/leaks of gases/fluids from conduits, in particular by arranging portable equipment comprising said apparatus, which can be advantageously used in the maintenance of gas pipes (e.g. ground methane) or in the study of the mass spectrometry of biological molecules such as proteins or their constituents.

The invention thus conceived is susceptible to several modifications and variations, all falling within the scope of the inventive concept.

The invention claimed is:

1. A method for molecular atomic analysis of a fluid in a gaseous state, comprising:
   introducing the fluid in the gaseous state into a collection chamber having a predetermined internal volume V;
   generating a laser beam by means of a laser device and focusing the beam into the fluid sited in the collection chamber, in order to create an electric field in at least a portion V' of the internal volume V, such as to excite elements residing on the atoms and molecules of the fluid in the gaseous state, whose binding energy is between about 1 eV and about 10 eV, causing an atomic/molecular alteration of the fluid itself in the portion V';
   detecting through detection means elements emitted following the focusing of the beam into the fluid; and
   analyzing the elements detected by the detection means by means of a processing unit;
   wherein generating a laser beam comprises varying at least once the frequency of the emitted beam; and
   wherein the processing unit is configured to operate the variation of the frequency of the laser beam emitted by the laser device based on the pressure conditions of the fluid sited in the collection chamber.

2. The method according to claim 1, wherein the processing unit is configured to operate the variation of the frequency of the beam emitted in IR frequencies upon the occurrence of a pressure of the fluid sited in the collection chamber whose value is between about $10^5$ Pa and about $3.3^3$ Pa, and/or in UV frequencies, upon the occurrence of a pressure of the fluid sited in the collection chamber whose value is between about $10^{-1}$ Pa and about $10^{-8}$ Pa.

3. The method according to claim 1, wherein the processing unit is configured to operate the variation of the frequency of the beam emitted by the laser device in VIS frequencies upon the occurrence of a pressure of the fluid sited in the collection chamber, whose value is between about $3.3^3$ Pa to about $10^{-1}$ Pa.

4. The method according to claim 1, wherein the laser device is a pulsed laser, with pulse energy between 10 mJ and 100 mJ, a pulse between 0.1 ns and 10 ns and in which the emitted beam is focused in an area ranging from 0.01 $mm^2$ to 1 $mm^2$.

5. The method according to claim 1, wherein focusing a laser beam into the fluid comprises realizing an optical path that crosses in succession a focusing lens placed outside the collection chamber, an inlet section of the collection chamber and an outlet section of the chamber itself, to terminate at a beam absorption device.

6. The method according to claim 1, wherein the detection means comprises optical fiber elements associated with a diffraction grating, and at least two electrodes placed at a potential difference, a value of which is between 1 KV and 10 KV, and wherein the optical fiber elements and the at least two electrodes are connected with the processing unit.

7. The method according to claim 6, wherein the analysis device comprises a spectrometer using at least one charge coupled device having a spectral resolution of 0.1 nm to 1 nm and a band coverage of between 200 nm and 1700 nm, wherein the charge coupled device is configured to analyze the elements detected by the optical fiber elements.

8. The method according to claim 6, wherein the analysis device is configured to analyze the elements detected by the electrodes by determining a time-of-flight parameter (TOF) for each element emitted.

9. The method according to claim 1, wherein the processing unit comprises at least one analysis device that carries out a spectroscopic analysis of the elements detected by the detection means and/or at least one analysis device that carries out a spectrometric analysis of the elements detected by the detection means.

10. The method according to claim 9, wherein the processing unit is configured to select the analysis device on the basis of the data detected by the detection means.

11. The method according to claim 1, wherein the processing unit is configured to vary the frequency of the beam emitted by the laser device on the basis of the data detected by the detection means.

12. An apparatus for molecular atomic analysis of a fluid in a gaseous state comprising:
   a laser device;
   a focusing lens;
   a collection chamber configured to receive a gaseous fluid;
   a detection means comprising optical fiber elements associated with a diffraction grating, and/or at least two electrodes placed at a potential difference, a value of which is between 1 KV and 10 KV, and
   a processing unit connected to the detection means;
   wherein the processing unit comprises at least one analysis device to carry out a spectroscopic analysis of elements detected by the detection means and at least one analysis device to carry out a spectrometric analysis of the elements detected by the detection means.

13. The apparatus according to claim 12, wherein the laser device is a pulsed laser configured to emit laser beams at different frequencies, with pulse energy ranging between 10 mJ and 100 mJ and a pulse included between 0.1 ns and 10 ns.

* * * * *